Dec. 11, 1934. T. H. MORRIS 1,984,315
AGGREGATE TREATING APPARATUS
Filed Oct. 17, 1931 2 Sheets-Sheet 1
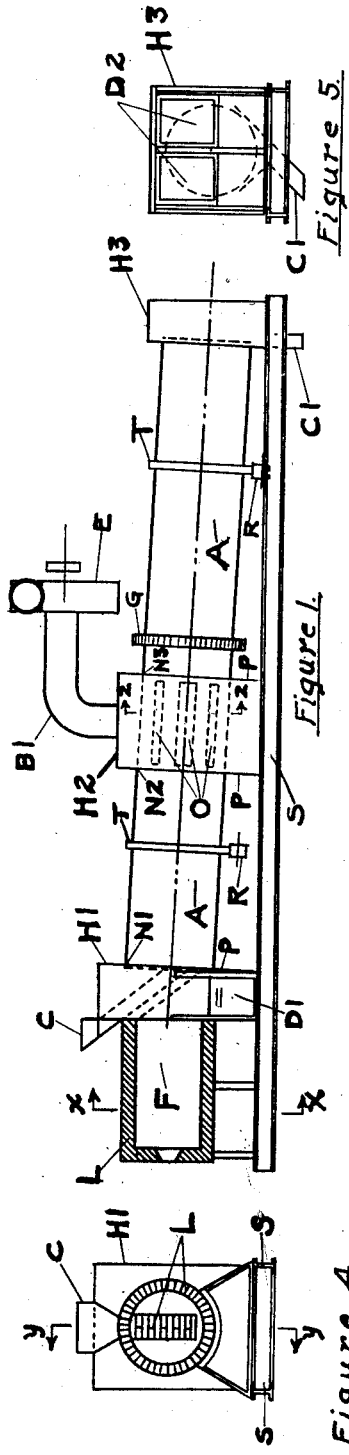
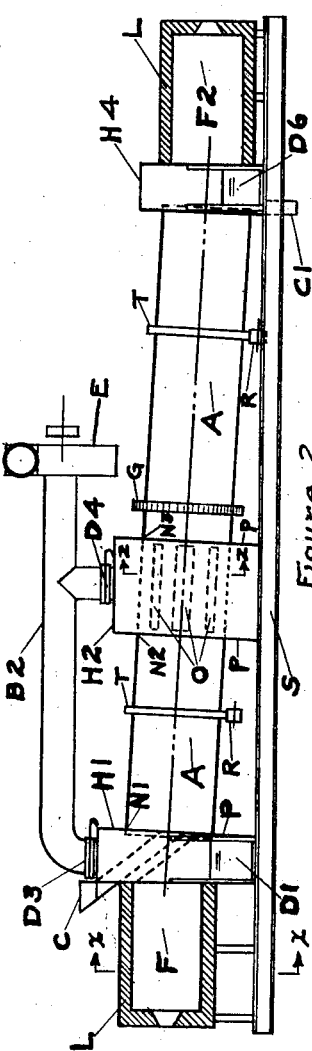
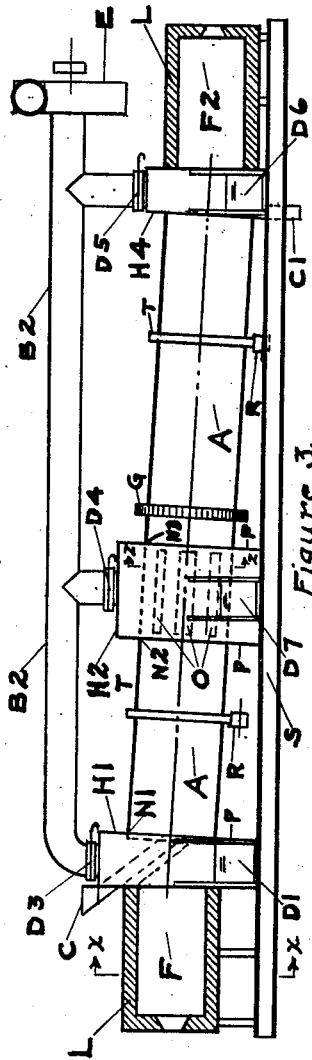
INVENTOR.
Theodore H. Morris Dec. 11, 1934.  T. H. MORRIS  1,984,315
AGGREGATE TREATING APPARATUS
Filed Oct. 17, 1931   2 Sheets-Sheet 2
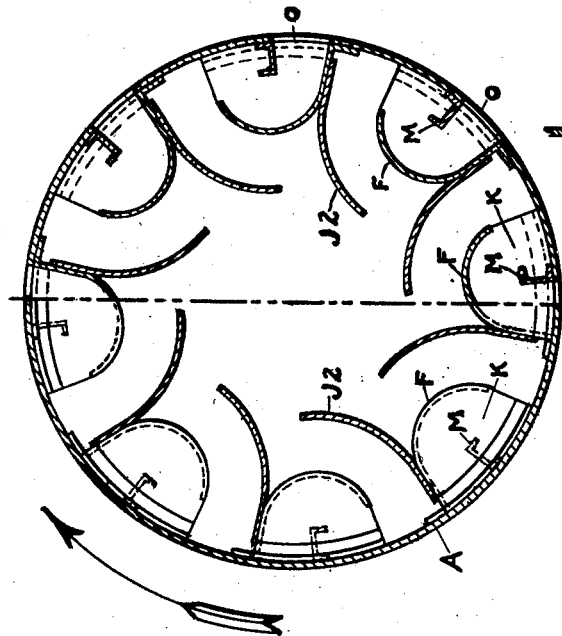
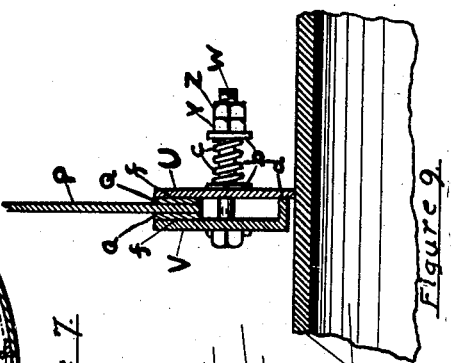
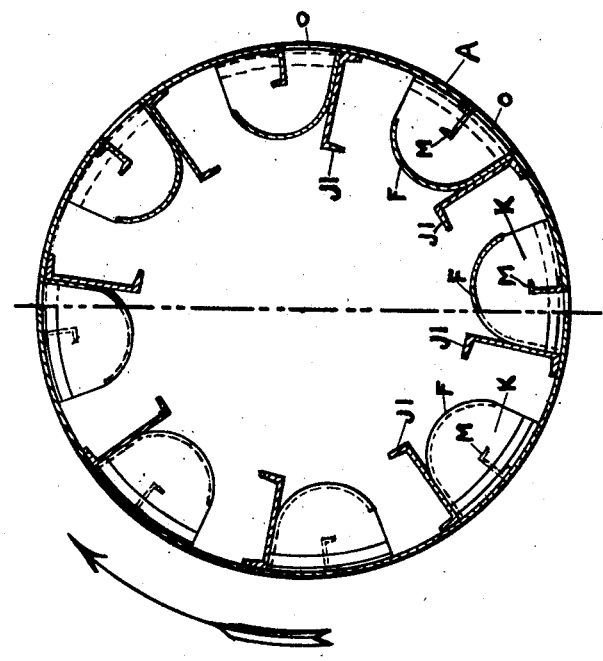
INVENTOR.
Theodore H. Morris Patented Dec. 11, 1934

1,984,315

UNITED STATES PATENT OFFICE 1,984,315

AGGREGATE TREATING APPARATUS

Theodore H. Morris, Wayne, Pa.

Application October 17, 1931, Serial No. 569,473

5 Claims. (Cl. 34—6)

The present invention relates generally to heating, drying, and cooling apparatus and more particularly to an apparatus for drying sand, stone, and other mineral aggregate for use with asphaltic cement and other bituminous materials for paving purposes.

Some of the objects of the present invention are to provide an improved apparatus for treating mixtures for paving or other purposes; to provide an apparatus wherein heating, drying, or cooling of the material to be treated can be carried out at will; to provide an apparatus for heating, drying, or cooling mixtures wherein the resultant temperature of the mixture can be controlled to give a predetermined temperature to the delivered material; to provide an apparatus for treating mixtures for paving or other purposes which is so arranged and constructed as to deliver the asphaltic or bituminous paving mixture either in a cold or a heated condition according to requirements; to provide a control for heating, drying, and cooling apparatus wherein the temperature of the treated material can be varied at will according to requirements; to provide an apparatus for treating mixtures wherein a rotatable cylinder forms a component part or is equipped intermediate its length with a means for tempering the condition of the products passing therethrough; to provide a device as a component part of a heating and cooling apparatus which permits the free uninterrupted mixing of the material while drawing off from such material heated gases and products of combustion and doing so without loss of material; to provide an outlet or outlets communicating with the interior of a rotatable cylinder which are so arranged and associated with other parts as to permit the free egress of air or gases while the so contained material is prevented from escaping through such openings; to provide a novel leakproof joint between two relatively movable parts, and to provide other improvements as will hereinafter appear.

In the accompanying drawings Fig. 1 represents a side elevation in part section of a heating, drying, and cooling apparatus embodying one form of the present invention; Fig. 2 represents a side elevation showing a modified form of the invention; Fig. 3 represents a side elevation showing a still further modification of the invention; Fig. 4 represents an end elevation of the apparatus shown in Fig. 1; Fig. 5 represents an end elevation of the discharge end of the apparatus shown in Fig. 1; Fig. 6 represents a section on line Z—Z of Fig. 1; Fig. 7 represents a section of the same line but showing a modified construction; Fig. 8 represents a perspective showing a detail of the discharge outlets and protecting members thereon; and Fig. 9 represents a section of detail showing a leak-proof joint between a movable cylinder and the stationary casing of the control member.

In general, with the exceptions hereinafter described, the three apparatuses Figures 1, 2 and 3 are similar in design. Each is comprised of the following main parts, namely; a revolving cylinder or drum A of suitable length and diameter. Two or more circular tracks or tires T fastened to the outer surface of A. These tracks, with the cylinder, are each supported by trunnion rollers R, which are each provided with suitable shafts and bearings, which in turn are supported by a main frame S, or other suitable foundation. A main drive gear G around the outer surface of A, which is made to rotate by a pinion which meshes with G and is driven by some external source of power not here shown. A feed chute C which extends from the outside to a short distance into one end of drum A. Chute C is provided with a covering L of fire brick or other refractory material on its outer surface as shown in Figure 4. The cylinder is inclined from the loading or feed chute end towards the discharge end as shown. A series of lifting flights, each approximately the length of the cylinder and composed of either a channel or angle section as shown by J1 in Figures 6 and 8 or of a curved plate as shown by J2 in Figure 7, or a combination of the same, are equally spaced around the inner circumferential surface of cylinder A and fastened thereto. A series of openings O, as shown in Figures 1 to 8 inclusive, through the surface of the cylinder shell A and located at a predetermined point between the ends of cylinder A. A series of hoods or bonnets F as shown by Figures 6, 7 and 8 fastened to the inner surface of cylinder A so that each shields one of the openings O. A stationary casing or breeching H2, supported by the main frame S, or other foundation, which completely covers the cylinder A the full length of the openings O and through which the cylinder A is free to rotate. A stationary housing or breeching H1 at the upper or feed end of cylinder A into which the cylinder projects a short distance and is free to rotate. An air and dust seal ring as shown in detail cross section by Figure 9 which seals the circumferential openings N1, N2 and N3 between the cylinder A and housings H1 and H2. One or more air draft dampers D1 in housing H1. A combustion chamber or furnace F with suitable burners and controls for the proper combustion of fuel oil, gas or other suitable fuel is provided at the feed end of cylinder A and is supported by the main frame S or other foundation and by the housing H1 to which it is tightly fastened and communicates. A fire brick or other refractory lining L covering the inner surface of F and allowing suitable cubic volume for proper combustion. A discharge chute C1 at the lower or discharge end of the cylinder A.

Figures 1, 2 and 3 show a cross section of the combustion chamber F on the line y—y and Figure 4 a cross section of the same on the line x—x.

The differences in the design and construction between the three apparatuses as shown by Figures 1, 2 and 3 are the following, namely; referring firstly to Figure 1. A stationary housing or breeching H3 located at the lower or discharge end of cylinder A and into which A projects a short distance and is free to rotate, H3 being supported by a main frame S or other foundation. One or more air draft dampers in H3 as shown by D2 in Figure 5. An exhaust breeching pipe B1 connected at one end to housing H2 and at its other end to the inlet of a power driven exhaust fan E of suitable size, speed and volume.

Referring secondly to Figure 2, the said differences in design and construction are as follows, namely: A stationary housing or breeching H4 is provided at the lower or discharge end of cylinder A and into which A projects a short distance and is free to rotate. H4 being supported by a main frame S or other foundation. One or more air draft dampers in H4 as shown by D6. A combustion chamber or furnace F2. similar to F, at the discharge end of cylinder A is supported by the main frame S, or other foundation, and by the housing H4 to which it is tightly fastened and communicates. An exhaust breeching pipe B2 having inlet connections to both housings H1 and H2 and outlet connection to the inlet of a power driven exhaust fan E of suitable size, speed and volume. Adjustable dampers D3 and D4 are provided in breeching pipe B2 respectively between housing H1 and fan E and between housing H2 and fan E so that either or both housings can be exhausted from as desired.

Referring thirdly to Figure 3, the said differences in design and construction between apparatuses shown by Figures 2 and 3 are the following, namely; an additional inlet connection between housing H4 and breeching pipe B2. An adjustable damper D5 in said connection between housing H4 and fan E, so that either housings H1, H2 or H4, or any two of said housings can be exhausted from as desired. One or more inlet dampers D7 in housing H2 is shown.

Figures 6 and 7 show in detail a cross section of cylinder A on the line z—z and present two optional designs of lifting flights J1 and J2 and their relation to the hoods F, these hoods being the same general design whether either type of flight is used. Figure 8 is a perspective drawing of the lifting flight J1 in relation to hood F and opening O.

The service of the lifting flights is to elevate and cascade the materials passing through the cylinder and as evenly as possible throughout each complete revolution. The number of flights installed may depend on the nature of the materials and the size and service required of the apparatuses. The flights are of suitable size and shape and so located in relation to the hoods F and the openings O as to serve also as an additional protecting shield over the openings O.

The service of the hoods F shown in Figures 6, 7 and 8 is to allow a free and unobstructed passage for air, gases of combustion and vapor gases out from the interior of cylinder A through the openings O and into housing H2 and from thence into the breeching pipe B1 or B2 from where they are exhausted as an induced draft by and through the exhaust fan E. Hoods F also serve as shields over openings O to prevent the falling of materials through the openings O into housing H2.

An additional shield to prevent the passage of materials through the openings O is provided by a standard bent channel, angle or plate M fastened to the cylinder shell A the full length of and directly in front of the openings O. Other shields are the plates K which close the ends of the hood F and are tightly fastened to F, the cylinder shell A and to the ends of M.

The total area of the several openings O, together with all clearances between any points of M and F, F and A, F and J1 or F and J2, are sufficient and such that a constant velocity of air and gases are maintained through or between them and not greater than the velocity of the air and gases passing through the interior of the cylinder. This design prevents, as far as possible the passage of the finer and lighter particles of material which might otherwise be carried from the cylinder A into housing H2.

Figure 9 shows in cross section the air and dust seal rings provided to cover the full circumferential openings between the outer surface of cylinder A and the end plates P where A passes through housing H2 at N2 and N3 and into housing H1 at N1. The service of these air and dust seal rings is to prevent the leakage of air from the outside into housings H1 and H2 and the leakage of dust out of these housings through the same openings and, at the same time, allow the cylinder free to rotate through the openings.

The design and construction of the seal ring is as follows, namely: An annular flat ring U so keyed to the outer circumference of cylinder A that it will revolve with the cylinder but having a slightly larger inside diameter than A it has a free movement longitudinally on the outer surface of cylinder A. P is the end plate of the housing through which cylinder A enters. Q are annular wearing rings or pads fastened around the openings through P through which cylinder A enters. V is an annular angle ring of slightly greater inside diameter than the inside diameter of U but of the same outside diameter as U. W are a series of bolts tightly fastened to and equally spaced on a circumferential line at approximately the center of the long leg of the annular angle ring V. An equal number of holes are provided through U through which project the bolts W. The bolts W together with the washers b, the compression spring c, the adjusting nut Y and the lock nut Z all serve to join together the annular angle ring V with the annular flat ring U, thus requiring V to rotate in unison with U, also to hold V in contact with U on the line d, also to hold the inner faces of V and U at f and f near their outer circumferences in sliding but close contact with the annular wearing rings Q. The bearing pressures of V and U against the wearing rings Q can be increased or decreased as desired by adjustment of the nut Y to provide a close but practically frictionless contact at f and f, thus providing an air and dust seal between cylinder A and the ends P of housing H1 and H2.

The operation of the three apparatuses described is as follows. Referring first to Figure 1, heat is supplied as desired to the interior of the cylinder A from the combustion chamber F. Materials to be dried and cooled are fed into the chute C from where they flow by gravity into the revolving cylinder A, through which they are gradually carried to the discharge chute C1 due to the inclination of the cylinder and the continual elevation and spilling of the materials from the flights J1 or J2. By regulation of the dampers D1 and D2 more or less air as desired is drawn from the outside through either or both ends of cylinder A towards the openings O, passing through O and the hoods F into housing H2, from whence it is exhausted by the fan E. As the materials travel through cylinder A from the feed end toward the openings O they are sufficiently heated by the blast of hot air and gases from combustion chamber F to vaporize practically the entire moisture content of the materials, this vapor being exhausted from cylinder A as described. As the materials travel over and beyond the openings O they are cooled and further dried by their contact with the blast of cool air drawn into the cylinder through the damper openings D2. The materials continue to be further dried, tempered as desired or cooled until they are finally discharged by gravity through chute C1. Thus, depending on the nature of the materials, their moisture content and the outside atmospheric conditions, almost positive control can be had of the final or desired temperatures of the material by proper regulation of the dampers D1 and D2 and the combustion chamber F.

Referring secondly to Figure 2, this apparatus can be operated in the same manner and the same results can be obtained therefrom, as described for apparatus Figure 1, if draft damper D3 is closed while draft damper D4 is open and draft dampers D6 are regulated for the entrance of outside air at the discharge end of cylinder A in place of draft dampers D2 in Figure 1. However, when it is desired to produce only materials at the higher temperatures for the purposes described hereinbefore, heat is supplied as desired to the interior of cylinder A from the combustion chamber F2 instead of from F. Materials are fed into and travel through cylinder A in the same manner as described heretofore and air from the outside is admitted as desired only through damper openings D6. With damper D3 open and damper D4 closed the gases of combustion and heated air pass through the entire length of cylinder A from the discharge end to the feed end where they are exhausted through the housing H1 and from thence through the breeching B2 from where they are finally exhausted by the fan E. Thus the materials are in intimate contact with only hot gases the entire time of their travel through the cylinder A and are dried and discharged therefrom at the highest temperatures obtainable from the apparatus for the purposes described hereinbefore.

Referring thirdly to Figure 3, this apparatus can be operated in the same manner and the same results can be obtained therefrom, as described for apparatuses Figure 1 and Figure 2. However, when operated in the following manner a more gradual decrease in temperature as desired can be given the materals. Heat is supplied to the interior of cylinder A only by combustion chamber F. Dampers D3 and D4 are closed and damper D5 is opened. Damper D1 is adjusted for the entrance of outside air as desired into housing H1. Damper D7 is adjusted for the entrance of outside air as desired into housing H2 and the cylinder A through the openings O. Thus the entrance of more or less cool air from the outside into the cylinder A through the openings O gives a more gradual cooling of both the gases and materials as both travel toward the discharge end of cylinder A, from which the gases are exhausted into the housing H4 and from thence into breeching B2 and are finally discharged by fan E.

Having thus described my invention, I claim:

1. In a drier for preparing a paving mixture the combination of a rotatable cylinder provided with an inlet and an outlet for material, a source of heat adjacent said inlet and arranged to project burning products into material within said cylinder, means for introducing cool air to opposite ends of said cylinder, a manually operated device for regulating said air, and an exhausting means between said inlet and said outlet for causing the material at one end of said cylinder to be in a heated condition and the material at the opposite end of said cylinder in a cooled condition according to requirements.

2. In a drier for preparing a paving mixture the combination of a rotatable cylinder provided with an inlet and an outlet for material, a source of heat arranged to project burning products into material entering said cylinder through said inlet, a source of heat arranged to project burning products into material adjacent the outlet of said cylinder, a controlled air inlet to said cylinder, and an exhaust outlet for mixed air and gas arranged intermediate the length of said cylinder, an exhaust outlet for mixed air and gas adjacent the inlet of said cylinder, common means for exhausting from said outlets and devices whereby said outlets can be selectively controlled.

3. In a drier for preparing a paving mixture the combination of a rotatable cylinder provided with an inlet and an outlet for material, a source of heat arranged to project burning products into material entering said cylinder through said inlet, a source of heat arranged to project burning products into material adjacent said outlet, an inlet for air located adjacent said discharge outlet, a gas outlet from said cylinder also adjacent said discharge outlet, a gas outlet from said cylinder adjacent to said inlet, a gas outlet from said cylinder intermediate said two gas outlets, a common means for exhausting said three gas outlets, and devices for respectively controlling said gas outlets.

4. In a drier the combination of a rotatable cylinder provided with an inlet and an outlet for material, a source of heat arranged to heat material entering said cylinder through said inlet, a source of heat for heating said material adjacent said discharge outlet, a plurality of air inlets to said cylinder, means for selectively controlling said air inlets, and an exhausting means arranged to communicate with said cylinder between said inlet and outlet and also near one end thereof, and means for selectively controlling the operation of said exhausting means.

5. In a drier the combination of a rotatable cylinder provided with an inlet and an outlet for material and having a plurality of longitudinally disposed slots circumferentially arranged between said inlet and said outlet, a housing encircling said cylinder and forming a chamber about said slots, a plurality of plates respectively arranged adjacent said slots and radially disposed with respect to said cylinder, deflector shields spaced respectively from said plates and arranged to provide a gas and air passage around said plates while preventing the passage of material to said slots, said plates and shields being so arranged relatively as to provide a plurality of passages having a combined area at least as great as the area of said cylinder, whereby the velocity of air and gas passing through said slots remains the same as the velocity of air and gas passing through said cylinder, and an exhaust means for drawing air and gas from said housing.

THEODORE H. MORRIS.